UNITED STATES PATENT OFFICE.

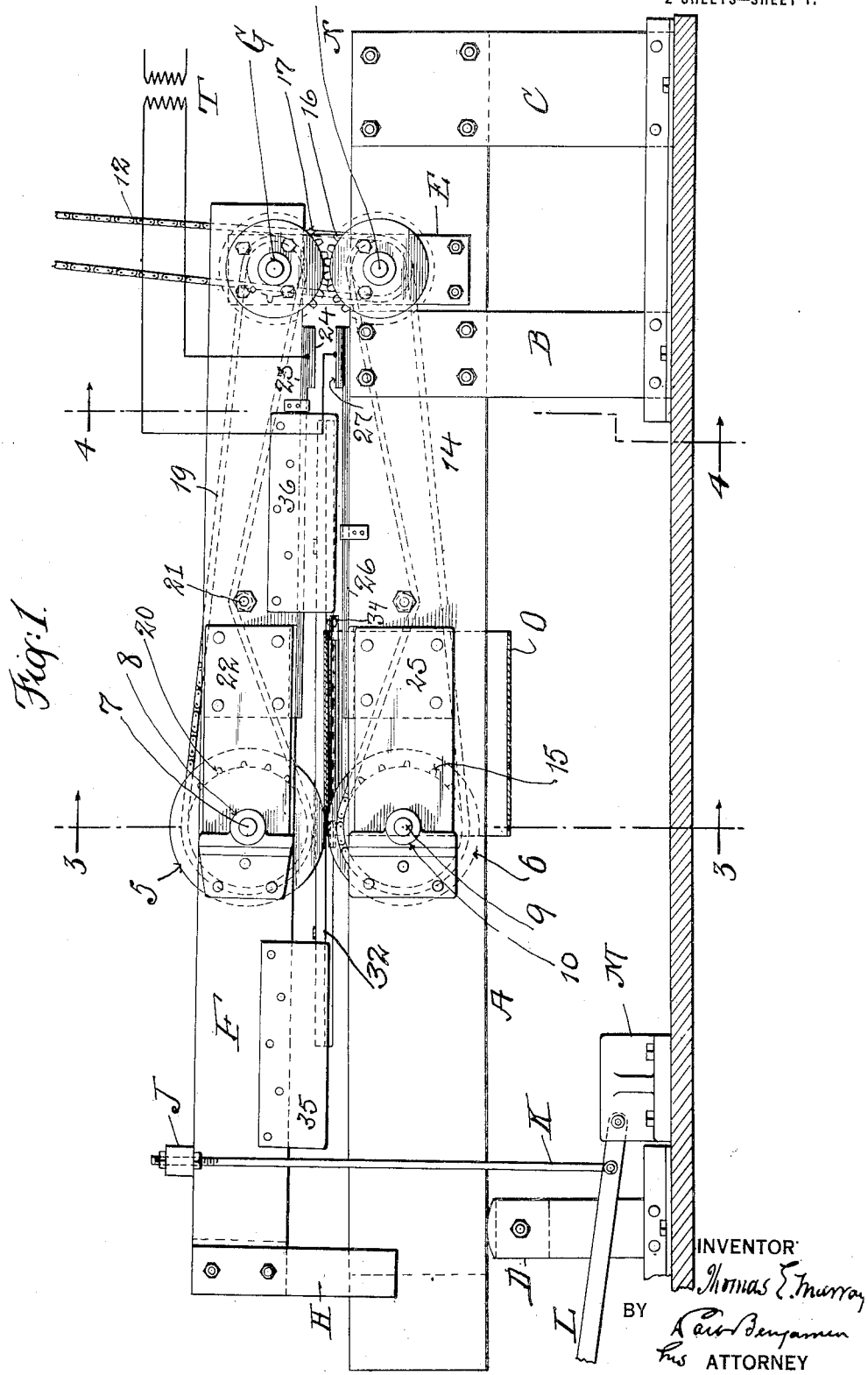

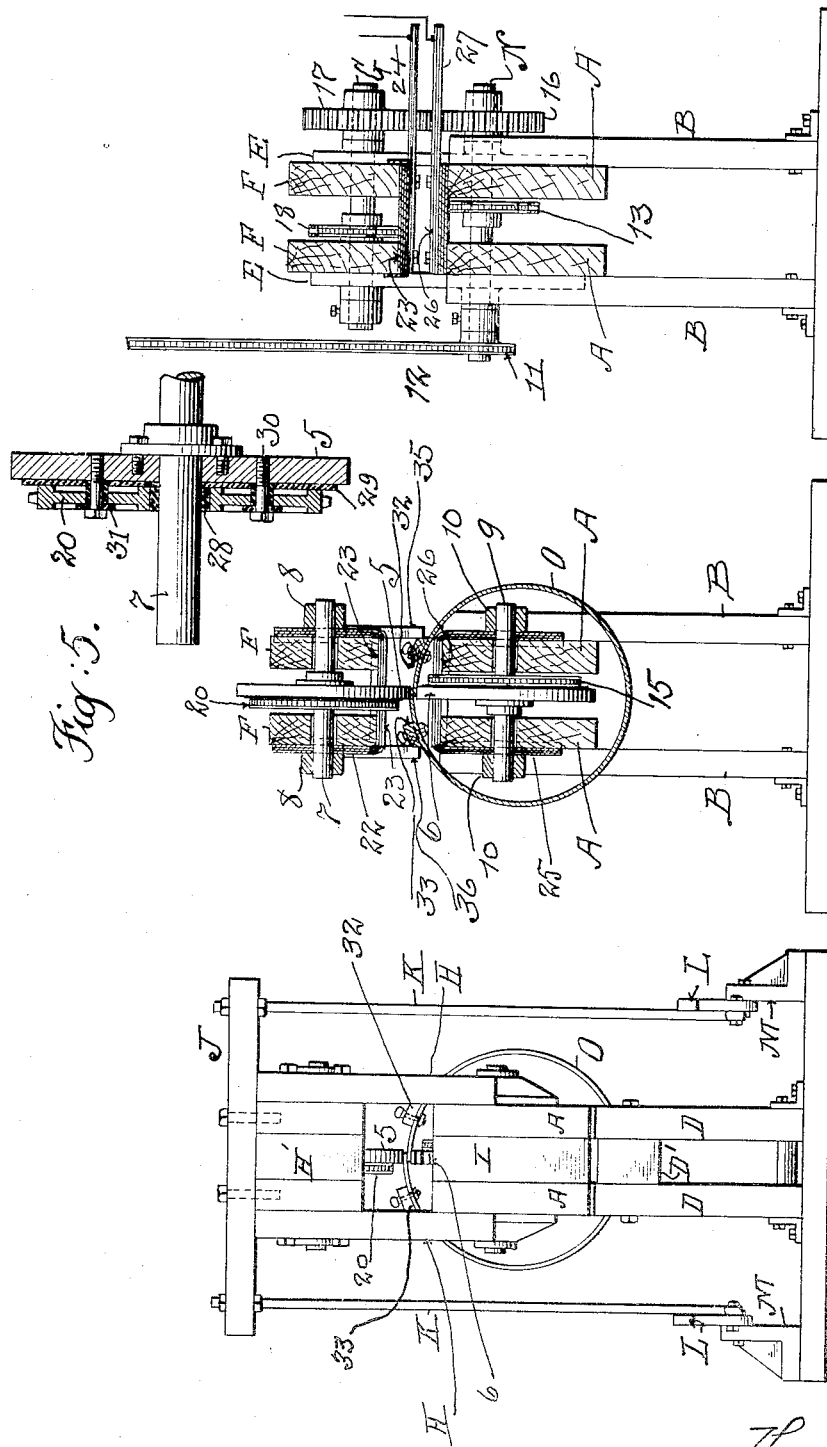

THOMAS E. MURRAY, OF NEW YORK, N. Y.

ELECTRIC WELDING-MACHINE.

1,259,274.  Specification of Letters Patent.  Patented Mar. 12, 1918.

Application filed December 10, 1917. Serial No. 206,402.

*To all whom it may concern:*

Be it known that I, THOMAS E. MURRAY, a citizen of the United States, residing at New York, in the county of New York and State of New York, have invented a certain new and useful Improvement in Electric Welding-Machines, of which the following is a specification.

The invention relates to electric welding machines of the type wherein the joint between the bodies to be welded is drawn progressively between two coöperating rotary disk electrodes by the rotation of said electrodes, whereby the weld is progressively formed. The invention consists in the construction hereinafter set forth, and also more particularly in the means for guiding the bodies to be welded, so that the weld during its formation will be caused to travel in a straight line.

In the accompanying drawings—

Figure 1 is a side elevation of my welding machine, the cylindrical shell, the overlapping edges of which have been welded, being shown in section. Fig. 2 is an elevation of the end of the machine on the left of Fig. 1. Fig. 3 is a vertical section on the line 3, 3, and Fig. 4 is a similar section on the line 4, 4 of Fig. 1. Fig. 5 is an enlarged section of one of the electrodes and sprocket wheel bolted thereto.

Similar letters and numbers of reference indicate like parts.

Two parallel beams A, A are each bolted, near one end, to pairs of vertical standards B, C. The outer ends of said beams rest upon the preferably convex ends of vertical struts D, between which is a spacing block D', Fig. 2. Bolted to the outer surfaces of beams A, A and between the pairs of standards B, C are vertical plates E, E. Two parallel beams F, F are pivoted on a shaft G which extends through said vertical plates E, E. Bolted to the outer sides of beams F, F at the free ends thereof are depending plates H which overlap the beams A, A and serve as guides for the beams F, F when the same are moved on pivot shaft G. Between the beams F, F at said free ends is secured a spacing block H', and between the like ends of beams A, A is secured a spacing block I, Fig. 2.

On the upper side of beams F, F is bolted a transverse bar J, to the ends of which are secured the upper ends of two rods K, the lower ends of said rods being pivoted to levers L, L, in turn pivoted in fixed brackets M. Said levers at their free ends may be connected by a cross bar, not shown, so that both may be forced down simultaneously by the operator, to swing the upper beams F, F toward the lower beams A, A for the purpose hereinafter explained.

5 and 6 are disk electrodes. The electrode 5 is between the upper beams F, F and carried on a shaft 7 which extends through said beams and is journaled in brackets 8 on the outer sides of said beams. The electrode 6 which is placed vertically below the electrode 5 and between the lower beams A, A is carried on a shaft 9 which extends through said beams and is journaled in brackets 10 on the outside of said beams. The electrodes 5 and 6 are rotated by the following mechanism. Fast on the shaft N, which extends through beams A, A and plates E, E, is a sprocket pulley 11, driven by chain belt 12 from any suitable source of power. On shaft N between beams A, A is a sprocket pulley 13, from which a chain belt 14 transmits motion to a sprocket pulley 15 on the shaft 9 of the lower electrode 6. Also on shaft N is a gear 16 which engages a gear 17 on shaft G. On shaft G between beams F, F is a sprocket pulley 18, from which a chain belt 19 transmits motion to a sprocket pulley 20 on shaft 7 of the upper electrode 5. The chain belts 14 and 19 pass over idler tightening rolls 21.

The electrical connections are as follows:

On the outer sides of beams F, F are laminated plates 22, through which the electrode shaft 7 passes, and which lie between the brackets 8 and said beams. These plates are connected by the long laminated plates 23 which are secured to the under sides of beams F, F. To the ends of plates 23 are connected laminated plates 24, Fig. 4, to which one terminal of the secondary of a transformer T is connected, the primary of said transformer being connected to the source of current supply.

On the outer sides of beams A, A are laminated plates 25, through which the electrode shaft 9 passes, and which lie between the brackets 10 and said beams. These plates are connected by the long laminated plates 26 which are secured to the upper sides of beams A, A. To the ends of plates 26 are connected laminated plates 27, to which the other terminal of the secondary of transformer I is connected.

Circuit is thus established through the electrodes 5, 6.

The sprocket pulley 20 is arranged as shown in section in Fig. 5. Between the pulley hub and shaft 7 is an insulating bushing 28. Between the pulley face adjacent to electrode 5 and said electrode is interposed a disk 29 of insulating material. The bolts 30 by which said pulley is secured to electrode 5 have insulating bushings 31. The electrode 5 is bolted to a fixed collar on shaft 7. In this way the parts are firmly united to insure a positive power transmission from pulley 20 to electrode 5. The sprocket pulley 15, electrode 6, and shaft 9 are connected together in the same way for the same purpose.

The machine as herein illustrated is designed to weld the overlapping longitudinal edges of a cylinder or shell O formed by bending a sheet of metal, which shell is disposed so that the joint to be welded comes between the electrodes 5, 6, and is then, by reason of the draft due to the rotation of said electrodes, moved onwardly, or from left to right in Fig. 1, so that the weld is completed progressively from one end of the joint to the other. The machine may, however, be used for welding together the edges of two bodies separate from one another.

In order that the shell or bodies to be welded may be guided so that the joint will remain in alinement with the electrodes, I secure to said shell two long bars 32, 33 by means of clamps 34 engaging the end edges of said shell. The outer longitudinal faces of said bars are beveled, so that when said bars are in place, said faces will lie in sliding contact with the inner surfaces of the pairs of vertical guide plates 35, 36 which depend from the upper beams F, F, respectively in advance and in rear of the electrodes. The bars 32, 33 extend longitudinally beyond the ends of shell O, and are to be of such length as that they will always lie between the members of the pairs of plates 35 and 36 during the travel of the shell.

The operation is as follows:

The bars 32, 33 being secured, as described, to the shell O, said bars are placed between the members of the pairs of guide plates 35, 36 and the end of the joint to be welded is inserted between electrodes 5, 6. Circuit is closed to the electrodes, which are set in rotation, drawing the joint progressively between them and producing the weld from one end of the shell to the other. The metal at the joint becoming plastic is consolidated and condensed by the weight of beams A, A forcing the electrode 5 downwardly upon said metal, and further pressure may be applied by the operator bearing down on levers L. When the weld is completed, by means of the same levers the beams F, F may be raised and the electrode 5 lifted from the joint, thus interrupting the welding current. The rotation of the electrodes is stopped, and the shell is drawn back by hand and removed from the machine.

I claim:

1. An electric welding machine, comprising two coöperating disk electrodes, means for rotating said electrodes in opposite directions to draw the joint progressively between them, and means for guiding the weld in a straight line.

2. An electric welding machine, as in claim 1, the said electrodes being disposed one above the other, and a support for the upper electrode free to move by gravity downwardly to press the upper electrode toward the lower electrode.

3. An electric welding machine, as in claim 1, the said electrodes being disposed one above the other, a movable support for the upper electrode, and means for applying variable pressure to said support to move the upper electrode downwardly toward the lower electrode.

4. An electric welding machine, comprising two coöperating disk electrodes disposed in the same plane, means for positively rotating said electrodes in opposite directions to draw the joint progressively between them, guide-bars attached to the objects to be welded, and fixed guides receiving said bars; whereby the weld produced by said electrodes is guided in a straight line.

5. An electric welding machine, comprising a fixed support, a pair of lower beams rigidly secured at one end to said support, a pair of upper beams pivoted at one end to said support and extending over said lower beams, two coöperating disk electrodes rotatably supported respectively between said pairs of beams, and disposed one above the other, and means for rotating said electrodes in opposite directions to draw the weld progressively between them.

6. An electric welding machine, as in claim 5, and means for guiding the bodies to be welded between said electrodes to cause said weld to travel in a straight line.

7. An electric welding machine, comprising a fixed standard, two elongated horizontal supports respectively disposed one above the other and secured at corresponding ends to said standard, two coöperating rotary disk electrodes mounted respectively in said supports, guide bars secured to the bodies to be welded and parallel to and on opposite sides of the joint between said bodies, and guide plates dependent from opposite sides of said upper support; the said guide bars being disposed between said guide plates and in sliding contact therewith.

8. An electric welding machine, as in claim 7, the said guide bars being prolonged beyond the ends of said bodies, and the said guide plates coöperating with said guide bars being disposed in pairs in advance and in rear of said electrodes.

In testimony whereof I have affixed my signature in presence of two witnesses.

THOMAS E. MURRAY.

Witnesses:
GERTRUDE T. PORTER,
MAY T. MCGARRY.